United States Patent [19]

Chlumsky

[11] Patent Number: 4,586,904
[45] Date of Patent: May 6, 1986

[54] DEVICE FOR FORMING TACTILE DISPLAY

[75] Inventor: Lubomir Chlumsky, Vienna, Austria

[73] Assignee: Siemens Aktiengesellschaft, Munich, Fed. Rep. of Germany

[21] Appl. No.: 717,727

[22] Filed: Mar. 29, 1985

[30] Foreign Application Priority Data

Mar. 30, 1984 [AT] Austria ............................ 1095/84

[51] Int. Cl.⁴ .......................................... G09B 21/02
[52] U.S. Cl. .................................................. 434/114
[58] Field of Search ................ 434/114, 113; 340/407

[56] References Cited

U.S. PATENT DOCUMENTS

| 3,736,672 | 6/1973 | Skewis | 434/114 |
| 3,987,438 | 10/1976 | Lindenmüeller et al. | 434/114 X |
| 4,191,945 | 3/1980 | Hannen et al. | 434/114 X |
| 4,266,936 | 5/1981 | Rose et al. | 434/114 |
| 4,500,293 | 2/1985 | Eltgen | 434/114 |

OTHER PUBLICATIONS

Xerox Disclosure Journal "Braille Points Duplication" vol. 1, No. 5, May 1976.

Primary Examiner—William H. Grieb
Attorney, Agent, or Firm—Kenyon & Kenyon

[57] ABSTRACT

A device for forming a tactilely readable message including Braille characters and graphic representations includes a planar display carrier with raised raster dots which are formed by spherical segments protruding selectively through openings in the surface of the display carrier. The display carrier is provided with a multiplicity of recesses arranged in a matrix-like array, the recesses being occupied by respective sensing or reading balls which are selectively movable in the recesses as keying elements for the raster dots. The recesses communicate at a lower end with respective chamber-like enlargements occupied by respective control balls of magnetically soft material which function to alternately position the reading balls in a lowered or in a raised position. The chamber-like enlargements are designed to provide for the control balls a lower stable position and an upper stable position corresponding respectively to the lowered and raised positions of the reading balls. For all the control balls of a matrix row, a resetting device in the form of a comb-liked slide is provided. The placement of the control balls in preselected positions for forming a readable display is accomplished by means of one or more individual magnets acting on the control balls via magnetic bridges designed as pole pieces.

11 Claims, 4 Drawing Figures

DEVICE FOR FORMING TACTILE DISPLAY

BACKGROUND OF THE INVENTION

This invention relates to a device for forming a tactilely readable display including Braille characters. More particularly, the invention relates to such a Braille reading device which has a planar display carrier with raised raster dots formed by spherical segments protruding selectively through openings in the surface of the display carrier.

The Braille format comprises a combination of 6 and 8 tactilely detectable raster dots which are arranged in a rectangular array, i.e., below one another and side by side. The raster is further characterized by different raster dot spacings. For Braille reading devices with key buttons, the "Marburg System Large," which has a Braille raster of 2.7 mm., is particularly suitable.

Known electromagnetically operable Braille reading devices of the above-described general type are provided with an indicctor or reading panel which has a hole raster with the basic Braille character configuration. In the holes are disposed pins which are upwardly movable independently of one another by means of electromagnets, the totality of the outwardly protruding pins forming a tactilely readable display including Braille characters. In one of the known Braille reading devices, the outwardly protruding pin ends take the form of spherical segments. In all of the conventional devices the size of the text which can be presented at one time is limited by the size of the display panel. If a single text cannot be accommodated on the display panel, the text must be subdivided into sections and stored, the stored text sections being converted into electrical signals.

As described in U.S. Pat. No. 3,987,438, a Braille reading device includes for each key button two magnets arranged one below the other at least in the axial direction, one or both of the magnets being designed as electromagnets. Through electrical excitation, the magnets generate a force in the axial direction of the key button. This force raises or lowers the key button by means of a magnet coil in accordance with the direction of excitation. For each key button a mechanical, magnetically controlled latching device is provided which acts only on the respective key button. The adaptation of such a Braille reading device to provide a graphic display as well as a display of Braille alphabet characters requires a large number of key buttons and a correspondingly large amount of mechanical actuating means.

An object of the present invention is to provide an improved device for forming a tactile display, including Braille characters, of the above-described general type.

Another, more particular, object of the present invention is to provide such a Braille reading device which enables a pictorial or graphic display, as well as a display of several lines of Braille characters.

Another particular object of the present invention is to provide such a Braille reading device in which the display can be copied onto a tangible storage medium.

Yet another particular object of the present invention is to provide such a Braille reading device which is capable of programming and interrogation functions.

Yet another specific object of the present invention is to provide a simplified Braille reading device of the above-described general type which has a relatively reduced number of components.

SUMMARY OF THE INVENTION

In accordance with the present invention, a device for forming a tactilely readable display including Braille characters comprises a display carrier having a substantially planar surface, the display carrier being provided with a multiplicity of recesses in a matrix-like array. Each of the recesses communicates at one end with a respective one of a multiplicity of openings in the planar surface of the display carrier. Each of the recesses also communicates at an opposite end with a respective one of a multiplicity of chamber-like enlargements of the recesses. The Braille reading device further includes a multiplicity of reading or sensing balls and a like multiplicity of position control balls, each such multiplicity being equal in number to the recesses in the display carrier. The reading balls are disposed in respective recesses, while the control balls are made of magnetically soft material and are disposed in respective ones of the chamber-like enlargements. The openings in the planar surface of the display carrier are smaller in size than the reading balls, whereby spherical segments thereof may protrude through the openings to provide raised raster dots of a tactile display. Each of the chambers or enlargements in the display carrier is provided with means for supporting a respective one of the control balls alternatively in a first stable position, corresponding to a raised position of the respective reading ball, and a second stable position, corresponding to a lower position of the respective reading ball.

The Braille reading device further includes a resetting mechanism for placing all of the control balls in a given one of the first and second stable positions. A setting mechanism is provided for moving selected control balls into the other of the stable positions upon an actuation of the resetting mechanism which places all of the control balls in the given one of the stable positions. The actuation of the resetting mechanisms and the subsequent actuation of the setting mechanism produces at the planar surface of the display carrier a tactilely readable display for conveying to a reader a message or a quantum of information. The tactilely readable display is formed by the protrusion of some of the reading balls through the associated openings in the planar surface.

The setting mechanism preferably includes a multiplicity of magnetic bridge pieces each juxtaposed in part to a respective one of the chamber-like enlargements. The magnetic bridge pieces facilitate the generation of magnetic field lines which act upon the control balls to move those balls from the given one of the stable positions to the other stable position. The setting mechanism further includes an electromagnetic energization device juxtaposition to the magnetic bridge pieces for generating a magnetic field in selected ones thereof.

In accordance with another feature of the present invention, the recesses are arranged in a multiplicity of matrix rows and a multiplicity of matrix columns. The setting mechanism includes at least one slide member movable in a direction parallel to the matrix columns, while the electromagnetic energization device includes an electromagnet disposed on the slide member.

In accordance with a particular feature of the present invention, the magnetic bridge pieces are each designed as a pole extension for an electromagnet and are each movably supported. The movability of the magnetic bridge pieces serves to amplify or magnify the effect of the magnetic forces because of a resultant shortening of the magnetic field lines.

In accordance with another particular feature of the present invention, the setting mechanism includes a drive in the form of a stepping motor and a serrated belt for moving the slide member. Such a drive facilitates control of the speed at which the Braille lines or graphic display elements are formed.

Pursuant to a specific feature of the present invention, the resetting mechanism includes a slidably mounted comb-like element and actuator means for shifting that element. Such an embodiment of the resetting mechanism enables a fast resetting operation. In addition, such a resetting mechanism has a low energy consumption.

Pursuant to yet another specific feature of the present invention, an editing row is provided on the planar display carrier, the editing row being separated from the matrix-like array of ball-occupied recesses by an elongate tactilely detectable element such as a space or a keying bar. The editing row has keying elements controllable via a slide arrangement formed in part by the slide member. The editing row enables the interaction of a blind operator with the tactile display.

Pursuant to further advantageous features of the present invention, a line of permanently coupled individual electromagnets is included in the editing row and several matrix lines of the matrix-like display are used as applied to Braille characters. An advantage of these features is the independent access to the editing row and a simple conversion of a six-dot to an eight-dot raster image, as well as the possible display of a curve as a portion of a graphic display.

In an advantageous embodiment of the present invention, at least one guide rail is provided for the slide member and serves in part for closing the magnetic circuit.

Advantageously, a plurality of individual electromagnets may be alternately mountable to the slide member for facilitating a raster change. Preferably, the electromagnets are mountable to the slide member by means of a plug and socket combination.

In accordance with the invention, the resetting mechanism may be designed so as to place the control balls in either the first stable position or the second stable position. Thus, if the majority of reading balls are to be placed in a raised position for a particular display pattern, it is advantageous from an energy consumption viewpoint to use the resetting mechanism to place the control balls in the first stable position and subsequently to operate the setting mechanism to move a relatively small number of the control balls from the first stable position to the second stable position. Alternatively, if a particular display pattern requires that more of the reading balls occupy a lowered position rather than a raised, detectable, position, it is advantageous to use the resetting mechanism to place all of the control balls in the second stable position and subsequently to move a selected number of the control balls from the second stable position to the first stable position by the setting mechanism.

In accordance with the invention, the resetting mechanism may be operated by a relatively large electromagnet, while the setting function is implemented by one or more relatively weak electromagnets.

DETAILED DESCRIPTION

Figure 1:
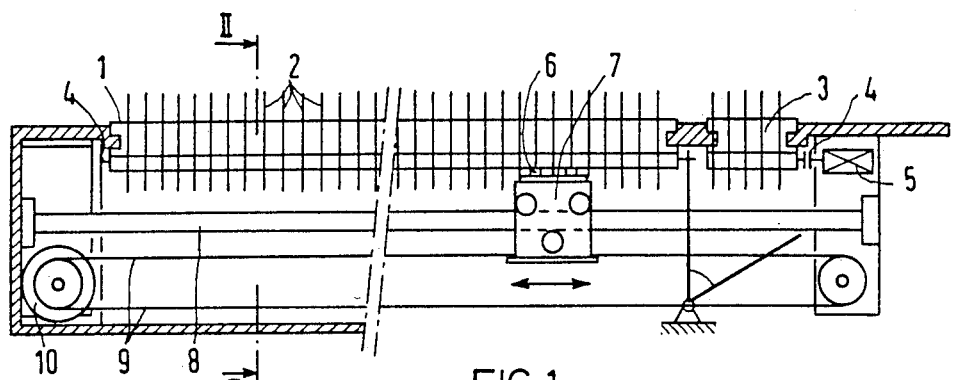
FIG. 1 is a schematic longitudinal cross-sectional view of a device for forming a tactilely readible display including Braille characters, in accordance with the present invention.

A device for forming a tactilely readible display including Braille characters and/or graphic representations includes a planar display carrier 1 in the form of a sensing plate provided with a multiplicity of recesses or well-shaped holes 11 which communicates at one end with circular openings 12 in the upper surface of display carrier 1. The recesses 11 communicate at an opposite end with respective chamber-like enlargements or extensions 13. The Braille reading device is provided with a multiplicity of reading or sensing balls 2 disposed in respective ones of the recesses 11 and with a multiplicity of position control balls 14 disposed in the chamber-like enlargements 13 (see FIG. 2).

Figure 2:
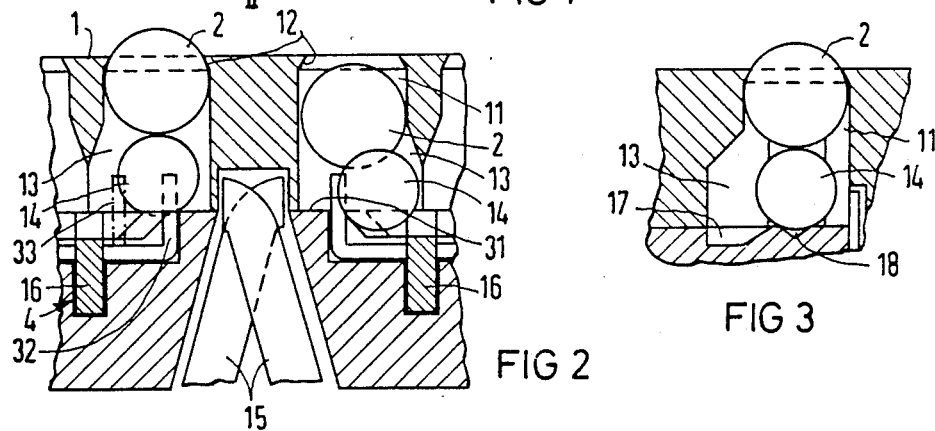
FIG. 2 is a detailed transverse cross-sectional view taken along line II—II in FIG. 1, showing setting and resetting mechanisms in the Braille reading device of FIG. 1.

As illustrated in FIG. 2, each chamber-like enlargement has a form providing the respective position control ball 14 with two stable positions. In the first stable position, the control ball rests on an upper ledge or shelf 31 and thereby supports the associated reading or sensing ball 2 in a raised position (see left hand side of FIG. 2), whereby the associated reading ball 2 projects partially through the respective opening 12 so that a spherical segment of the ball is disposed on the outer surface of planar display carrier 1 to form a raised raster dot in a display pattern. A second stable position, lower and laterally disposed with respect to the first stable position, is defined in each chamber-like enlargement 13 by means of a lower shelf or, alternatively, edges and other structural features. When a control ball 14 is disposed in its second stable position, the associated reading ball 2 is located in a lowered, nonreading, position (see right hand side of FIG. 2).

As illustrated schematically in FIG. 1, recesses 11, together with the associated reading balls 2 are disposed in a rectangular matrix-like array having a multiplicity of matrix rows and a multiplicity of matrix columns. In addition, the Braille reading device is advantageously provided with an editing row 3. Editing row 3 includes several lines of raster dots shiftable from one position to another manually by an operator, whereby the operator can interact with the Braille reading machine to modify a message displayed thereon.

For resetting the keying elements or reading balls 2, i.e., for placing all of the balls 2 and 14 in lowered positions, an elongate comb-like slide member 4 is provided below the planar display carrier 1. Slide member 4 is parallel to the matrix columns and longitudinally coextensive therewith. The comb-like slide is operatively connected to an actuator magnet 5, whereby the slide may be shifted in a longitudinal direction.

As illustrated in FIG. 2, slide member 4 may comprise a body portion 16 and a multiplicity of L-shaped fingers 32 fastened to body portion 16 and spaced from one another along the length thereof. Upon the shifting of slide member 4 to the right in FIG. 1, the control balls 14 which are located in their upper stable positions are cammingly engaged by respective fingers 32 and thereby pushed from the upper stable positions to the lower stable positions.

The Braille reading device is preferably provided with a plurality of laterally spaced slide members 4 each associated with a respective matrix column, wherein each such column has two parallel lines of ball-containing recesses 11. To body portion 16 of each slide member 4 is attached two rows of L-shaped fingers 32 for resetting the balls in respective lines of the matrix column associated with the particular slide member 4. Each slide member 4 may be provided with two additional sets of actuator fingers 33 connected to body portion 16 and spaced from one another along the length thereof. The actuator fingers 33 may be aligned with the lower stable positions of the control balls 14 so that, upon a shifting of the slide members, the actuator fingers cammingly engage any lowered control balls 14 and push them from the lower stable positions to the upper stable positions. On each side of body portion 16 an array of L-shaped resetting fingers 32 is longitudinally staggered with respect to an associated array of actuator fingers 33 so that motion of the respective slide member 4 from a neutral or rest position in one direction (e.g., to the right in FIG. 1) enables the camming action of L-shaped fingers 32, while action of the slide member from the neutral position in the opposite direction enables the camming action of the actuator fingers 33.

Figure 3:
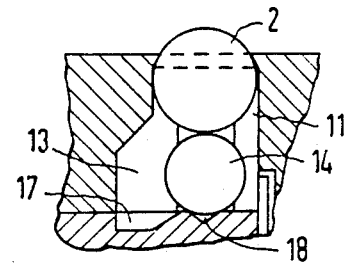
FIG. 3 is a cross-sectional view similar to FIG. 2, showing an alternative embodiment of a structure for forming a raised raster dot in a Braille reading device such as that illustrated in FIG. 1.

As illustrated in FIG. 3, juxtaposed to each chamber-like enlargement 13 is the end of a magnetic bridge piece 15 made of magnetic material and functioning as a pole extension of an electromagnet 6 (see FIG. 1). As shown in FIG. 1, electromagnet 6 is disposed on a carriage 7 slidably mounted to at least one guide rail 8 extending parallel to the matrix columns of the Braille reading device. Carriage 7 is shifted by a stepping motor 10 having a rotary output shaft operatively connected to the carriage by means of a serrated belt 9. The operation of motor 10 is controlled by a programming unit such as a microprocessor (not illustrated) to position electromagnet 6 beneath selected magnetic bridge pieces 15.

In a preferred embodiment of the invention as illustrated in FIGS. 1 and 2, the reading device is reset by pushing the control balls 14 from their upper stable positions to their lower stable positions. In order to raise a selected reading ball 2 from its lowered position, defined by a horizontal plane L located below the surface of display carrier 1, to a raised position, defined by another horizontal plane H above the surface of carrier 1, carriage 7 is shifted by stepping motor 10 to position electromagnet 6 proximately to the magnetic bridge piece 15 associated with the subject ball. The programming unit (not illustrated) then energizes electomagnet 6 so that an attractive magnetic force is exerted on the respective control ball 14 to pull the ball from its lower stable position to its upper stable position and to concomitantly shift the subject reading ball into its raised position.

Alternatively, a matrix column may be reset by shifting the respective slide member 4 so that actuator fingers 33 push all the control balls 14 of the matrix column from their lower stable positions to their upper stable positions. Current may be caused to flow through the excitation coil of electromagnet 6 so as to exert a repelling force on the control ball associated with a selected reading ball 2, thereby moving the control ball 14 from its upper stable position and allowing the force of gravity to pull the ball into its lower stable position.

Carriage 7 may be provided with a plurality of individual electromagnets 6 for simultaneously setting a plurality of reading balls or keying elements 3. In the case of a six-dot Braille display, 15 lines of 40 characters are provided, amounting to 80 keying elements per line and 59 keying elements per column.

As illustrated in FIG. 3, a chamber-like enlargement 13' of a ball-containing recess 11 may provide two stable positions for the control ball 14, the upper stable position being defined by a conical depression 18 located vertically below the ball-containing recess 11 and the lower stable position being defined by another depression 17 disposed below the ball-containing recess 11. Owing to a relatively rigid latching of the control ball by the conical depression 18, the informational content of a tactile display may be taken from the planar display carrier 1 in a simple manner exemplarily by using a rubber roller to press a paper web or a foil against the raised ball portions.

Figure 4:
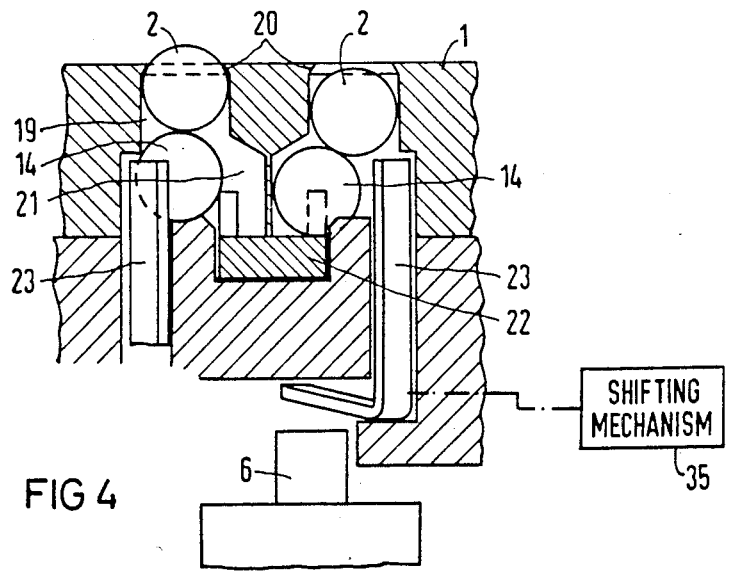
FIG. 4 is a detailed transverse cross-sectional view, similar to FIG. 2, showing an alternative embodiment of setting and resetting mechanisms for controlling the formation of a raised dot pattern in accordance with the invention.

In the specific embodiment illustrated in FIG. 4, the planar display carrier 1 is provided with a multiplicity of cylindrical recesses 19 distributed in a matrix-like array having a multiplicity of matrix columns and a multiplicity of matrix rows. Each cylindrical recess is occupied by a respective keying element in the form of a ball or sphere 2. The balls 2 are prevented from escaping from their respective recesses 19 by means of a circular collar 20 defining an opening with a diameter smaller than the diameter of the keying balls 2. Each cylindrical recess is provided at a lower end with a chamber-like enlargement 21 occupied by a control element in the form of an additional ball 14. When a particular keying ball 2 is set, i.e., when the keying ball is in a raised position so that it partially protrudes above the surface of the display carrier 1, the associated control ball 14 lies vertically below the first ball 2, whereas when the keying ball is released, the control ball lies laterally below the first ball 2 in the chamber-like enlargement 21. Setting the keying element or first ball 2 is accomplished in the particular embodiment of FIG. 4 by moving the control ball 14 out of the chamber-like enlargement 21 by means of a comb-like slide 22 actuated by an electromagnet (e.g., electromagnet 5 in FIG. 1). Upon the shifting of the control ball from a lower stable position to an upper stable position, the associated first ball is lifted into a raised position. A pole piece or extension 23, which is advantageously movable laterally into the chamber-like enlargement 21, repells the second or control ball 14 from the upper stable position and thereby releases the associated keying ball. The movable pole piece 23 is excited via an individual electromagnet 6 mounted to the carriage 7 FIG. 1). In the detailed embodiment illustrated in FIG. 4 the keying balls 2 of an entire matrix column are placed in a raised or read position by means of a slidable comb-like structure 22. The keying elements or balls 2 are released, i.e., returned to a lowered position, via individual electromagnets 6 which generate a repelling magnetic force via pole pieces 23 associated with respective chamber-like enlargements 21. Pole pieces 23 are advantageously shiftable in a lateral direction parallel to the surface of display carrier 1 by means of a shifting mechanism 35. The embodiment of FIG. 4 is particularly advantageous if the tactile display is such that a predominant number of keying elements is to be set.

Each hole/ball combination is unit unto itself and represents a tactilely detectable dot of a Braille character or of a graphic display and can be addressed individually by means of carriage-mounted electromagnets 6 and a respective pole piece 15 or 23. Electromagnets 6 serve as the dot-generating control components and are mounted in one or more rows in any desired number on one or more movable carriages 7. Stepping motor(s) 10 and serrated belt(s) 9 are driven by a programming unit (not illustrated) to position the electromagnets 6 under each keying element which is to be set.

In a raised position, the sensing or reading ball 2 of a hole/ball combination protrudes from the surface of the display carrier by approximately 0.5 mm. Through suitable choices of materials for the sensing or reading balls 2 (e.g., metal, corrosion resistant, antimagnetic), the control balls 14 (metal, magnetic) and the sensing plate or display carrier 1 (plastic), a high level of operating reliability can be achieved.

A Braille reading device in accordance with the present invention uses fewer moving parts than currently available devices of this general type and has a relatively low power requirement. In addition, a device in accordance with the invention is economically inexpensive to produce. The Braille reading device can be used in stationary and transportable equipment with appropriate electronic addressing circuitry.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the descriptions and the illustrations herein are profferred by of example to facilitate comprehension of the invention and should not be construed to limit the scope thereof.

What is claimed is:

1. A device for forming a tactilely readable display including Braille characters, comprising:
   a display carrier having a substantially planar surface, said display carrier being provided with a multiplicity of well-shaped recesses in a matrix-like array, each of said recesses communicating at one end with a respective one of a multiplicity of openings in said planar surface, each of said recesses communicating at an opposite end with a respective one of a multiplicity of chamber-like enlargements;
   a multiplicity of first balls equal in number to said recesses, each of said balls being disposed in a respective one of said recesses, said openings being smaller in size than said first balls;
   a multiplicity of second balls of magnetically soft material equal in number to said recesses, said second balls being disposed in respective ones of said enlargements, each of said enlargements being provided with means for supporting the respective one of said second balls alternatively in a first stable position, corresponding to a raised position of the respective one of said first balls, and a second stable position, corresponding to a lowered position of said respective one of said first balls;
   frame means connected to said display carrier for supporting same;
   resetting means coupled to said frame means for placing all of said second balls in one of said first and said second stable position;
   setting means linked to said frame means for moving selected ones of said second balls into the other of said first and said second stable position upon an actuation of said resetting means placing all of said second balls in said one of said first and said second stable position, thereby producing a tactilely readable display at said planar surface formed by the protrusion of some of said first balls through the associated openings in said planar surface to provide raised raster dots, said setting means including a multiplicity of magnetic bridge pieces each juxtaposed in part to a respective one of said enlargements for facilitating the generation of magnetic field lines to move said second balls from said one of said first and said second stable position to said other thereof, said setting means further including electromagnetic energization means juxtaposable to said magnetic bridge pieces for generating a magnetic field in selected ones thereof.

2. The device defined in claim 1 wherein said recesses are arranged in a multiplicity of matrix rows and a multiplicity of matrix columns, said setting means further including at least one slide member movable in a direction parallel to said matrix columns, said electromagnetic energization means including an electromagnet disposed on said slide member, said slide member being disposed below said display carrier.

3. The device defined in claim 2 wherein said magnetic bridge pieces are each designed as a pole extension for an electromagnet and are each movably mounted to said frame means.

4. The device defined in claim 2 wherein said setting means further includes drive means in the form of a stepping motor and serrated belt for moving said slide member.

5. The device defined in claim 2 wherein said resetting means includes a slidably mounted comb-like element and actuator means for shifting said comb-like element.

6. The device defined in claim 2, further comprising an editing row on said display carrier, said editing row being separated from said matrix-like array by an elongate tactilely detectable element, said editing row having keying elements controllable via a slide arrangement formed in part by said slide member.

7. The device defined in claim 6 wherein a line of permanently coupled individual electromagnets is provided as said editing row.

8. The device defined in claim 2 wherein said matrix-like array has a plurality of rows of recesses used as Braille editing rows.

9. The device defined in claim 2 wherein said setting means includes a guide rail connected to said frame means, said slide member being movably mounted to said giude rail, said guide rail serving in part to close a magnetic circuit formed by said electromagnet.

10. The device defined in claim 1 wherein a plurality of individual electromagnets are alternately mountable to said slide member for facilitating a raster change.

11. The device defined in claim 1, wherein said resetting means includes means for alternately placing said second bails in one and then the other of said first and second stable position.

* * * * *